(12) United States Patent
Gau

(10) Patent No.: US 11,513,788 B2
(45) Date of Patent: *Nov. 29, 2022

(54) SYSTEMS AND METHODS FOR GENERATING AND MANAGING DOMAIN-BASED TECHNOLOGY ARCHITECTURE

(71) Applicant: Cigna Intellectual Property, Inc., Wilmington, DE (US)

(72) Inventor: Chungjet Gau, Kissimmee, FL (US)

(73) Assignee: Cigna Intellectual Property, Inc., Wilmington, DE (US)

(*) Notice: Subject to any disclaimer, the term of this patent is extended or adjusted under 35 U.S.C. 154(b) by 9 days.

This patent is subject to a terminal disclaimer.

(21) Appl. No.: 17/379,032

(22) Filed: Jul. 19, 2021

(65) Prior Publication Data

US 2021/0389942 A1 Dec. 16, 2021

Related U.S. Application Data

(63) Continuation of application No. 16/898,305, filed on Jun. 10, 2020, now Pat. No. 11,068,254.

(51) Int. Cl.
*G06F 8/65* (2018.01)

(52) U.S. Cl.
CPC ..................... *G06F 8/65* (2013.01)

(58) Field of Classification Search
USPC ......................................................... 717/172
See application file for complete search history.

(56) References Cited

U.S. PATENT DOCUMENTS

| 8,910,288 | B2 | 12/2014 | Young |
| 9,785,663 | B2 | 10/2017 | Gupta |
| 9,792,294 | B2 | 10/2017 | Lin |
| 9,805,056 | B2 | 10/2017 | Parkison |

(Continued)

OTHER PUBLICATIONS

Overview of the Maintenance Snapshot, oracle.com website; https://docs.oracle.com/en/cloud/saas/enterprise-performance-management-common/cgsad/5_main_snapshot_overview.html, May 26, 2018.

*Primary Examiner* — Qing Chen
*Assistant Examiner* — Clint Thatcher
(74) *Attorney, Agent, or Firm* — Stinson LLP

(57) ABSTRACT

A technology management server for domain-based technology deployment and management is provided. The server includes a processor configured to receive an architecture definition file identifying a prior system status for each snapshotted application system. The processor is also configured to scan the application systems and classify each of the scanned application systems into an associated technology domain using a domain classification algorithm. The processor is configured to identify each scanned application system with a changed system status. The processor is configured to obtain a system update for each scanned application system with a changed system status, based on the technology domain. The system updates define implementation characteristics of each changed scanned application system. The processor is also configured to redefine the architecture definition file with the system updates. The processor is further configured to apply the architecture definition file to the application systems to update the application systems.

20 Claims, 4 Drawing Sheets

(56) References Cited

U.S. PATENT DOCUMENTS

| | | | |
|---|---|---|---|
| 10,243,795 B2 | 3/2019 | Gupta | |
| 10,305,937 B2 | 5/2019 | Weiss | |
| 10,496,397 B2 | 12/2019 | Lodeiro | |
| 2006/0080656 A1* | 4/2006 | Cain | G06F 8/65 |
| | | | 434/118 |
| 2010/0030734 A1 | 2/2010 | Chunilal | |
| 2016/0092210 A1* | 3/2016 | Kuchibhotla | H04W 4/60 |
| | | | 717/121 |
| 2016/0294605 A1* | 10/2016 | Searle | H04L 41/069 |
| 2017/0168799 A1 | 6/2017 | Smith | |
| 2017/0293872 A1 | 10/2017 | Vonderhaar | |
| 2018/0191867 A1 | 7/2018 | Siebel | |
| 2019/0171438 A1 | 6/2019 | Franchitti | |
| 2019/0250898 A1* | 8/2019 | Yang | G06F 9/547 |
| 2019/0377654 A1 | 12/2019 | Rakhimov | |
| 2020/0021629 A1 | 1/2020 | Vuong | |
| 2020/0076770 A1 | 3/2020 | Biran | |
| 2020/0204443 A1 | 6/2020 | Bar Oz | |
| 2020/0342114 A1 | 10/2020 | Mohan | |
| 2020/0349134 A1* | 11/2020 | Peterkin | G06F 16/22 |

\* cited by examiner

SYSTEMS AND METHODS FOR GENERATING AND MANAGING DOMAIN-BASED TECHNOLOGY ARCHITECTURE

CROSS REFERENCE TO RELATED APPLICATIONS

This application is a continuation of U.S. application Ser. No. 16/898,305, which was filed Jun. 10, 2020. The entire disclosure of said application is incorporated herein by reference.

FIELD OF INVENTION

The field relates to technology architectures and, more specifically to techniques for generating and managing domain-based technology architectures.

BACKGROUND OF THE DISCLOSURE

In enterprise computing environments, designing, deploying, and managing technology architectures is a significant challenge due to the increasing complexity and scope of such architectures. Notably, these environments often include hundreds or thousands of architectural components (e.g., applications, servers, connectors, messaging systems, event processors, security components, storage devices) which are managed through their respective life cycles. The process of migrating such components through pre-deployment to end-of-life is intricate and each component may be interdependent on or with many other components.

Because of such complex interrelationships and interdependencies, there is significant risk in not properly deploying and managing the components. For example, deploying the wrong architecture or failing to update, manage, or remove architecture can lead to cascading failures or outages in a system. Further, improper management may lead to decreased efficiency of an environment.

Known systems and methods for architecting, deploying, and managing components have significant limitations. First, known systems fail to embrace rapidly evolving and heterogeneous tool sets. Second, known systems fail to address the entire lifecycle of components. Third, known systems fail to incorporate interdependencies of components.

Accordingly, systems and methods for designing, generating, and managing domain based technology architectures are desired.

BRIEF SUMMARY OF THE INVENTION

In one aspect, a domain-based technology deployment and management system is provided. The system includes application systems. At least one of the application systems includes a system processor and a system memory. The system also includes a technology management server including a processor and a memory. The technology management server is in communication with the application systems. The processor is configured to receive an architecture definition file created from a prior snapshot of the application systems. The architecture definition file identifies a prior system status for each snapshotted application system. The processor is also configured to scan the application systems to determine a present system status for each application system. The processor is further configured to classify each of the scanned application systems into an associated technology domain using a domain classification algorithm. The processor is also configured to identify each scanned application system with a changed system status by comparing the associated prior system status to the associated present system statuses. The processor is further configured to obtain a system update for each scanned application system with a changed system status. The system update is obtained based on the technology domain. The system updates define implementation characteristics of each changed scanned application system. The processor is also configured to redefine the architecture definition file with the system updates. The processor is further configured to apply the architecture definition file to the application systems to update the application systems based, in part, on the system updates.

In another aspect, a method for domain-based technology deployment and management is provided. The method is performed by a technology management server in communication with application systems. The technology management server includes a processor and a memory. At least one of the application systems includes a system processor and a system memory. The method includes receiving an architecture definition file created from a prior snapshot of the application systems. The architecture definition file identifies a prior system status for each snapshotted application system. The method also includes scanning the application systems to determine a present system status for each application system. The method further includes classifying each of the scanned application systems into an associated technology domain using a domain classification algorithm. The method also includes identifying each scanned application system with a changed system status by comparing the associated prior system status to the associated present system statuses. The method additionally includes obtaining a system update for each scanned application system with a changed system status. The system update is obtained based on the technology domain. The system updates define implementation characteristics of each changed scanned application system. The method also includes redefining the architecture definition file with the system updates. The method further includes applying the architecture definition file to the application systems to update the application systems based, in part, on the system updates.

In yet another aspect, a technology management server for domain-based technology deployment and management is provided. The technology management server includes a processor and a memory. The processor is configured to receive an architecture definition file created from a prior snapshot of the application systems. The architecture definition file identifies a prior system status for each snapshotted application system. The processor is also configured to scan the application systems to determine a present system status for each application system. The processor is further configured to classify each of the scanned application systems into an associated technology domain using a domain classification algorithm. The processor is also configured to identify each scanned application system with a changed system status by comparing the associated prior system status to the associated present system statuses. The processor is further configured to obtain a system update for each scanned application system with a changed system status. The system update is obtained based on the technology domain. The system updates define implementation characteristics of each changed scanned application system. The processor is also configured to redefine the architecture definition file with the system updates. The processor is further configured to apply the architecture definition file to the application systems to update the application systems based, in part, on the system updates.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

In the drawings, reference numbers may be reused to identify similar and/or identical elements.

DETAILED DESCRIPTION

Figure 1:
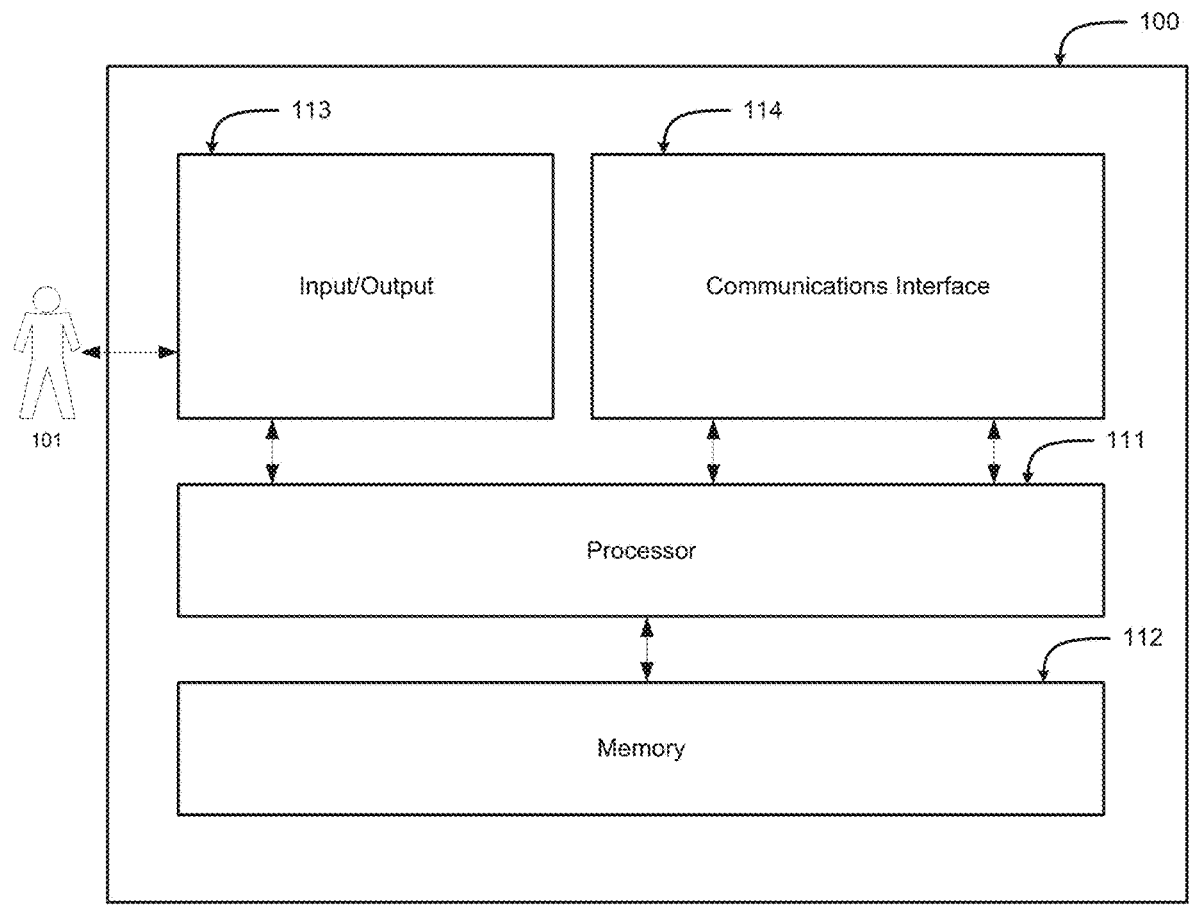
FIG. 1 is a functional block diagram of an example computing device that may be used in the domain-based technology deployment and management system described.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term "technology domain" or "domain" refers to a taxonomical approach to classifying computing systems and applications to provide the technology deployment and management systems described herein. In some examples, the technology domains described include a data platform domain, a content and data science domain, an enterprise network domain, a user enabling domain, an operational management domain, a platform and facilities domain, a delivery enabling domain, a security enabling domain, and a middleware domain.

The domain-based technology deployment and management systems and methods described herein are configured to address known technological problems in computing systems and networks. Specifically, in many known complex computing systems, managing technology infrastructure is a complex and intricate problem. When applications, technologies, or systems are migrated through the technology lifecycle, from installation to end-of-life, each application, technology, or system may have significant impact if they are mismanaged or misconfigured. For example, utilizing a product or service prematurely, with the wrong configurations, or past a point of an end-of-life cycle may have negative impacts to other technologies. Further, management is complicated because of sheer complexity and scope. Accordingly, a domain-based technology deployment and management system is desired to address these known problems.

The systems and methods are deployed, in one embodiment, using a domain-based technology deployment and management system. The system includes application systems that may be associated with a variety of domains and sub-domains. For example, the application systems may include a data platform domain, a content and data science domain, an enterprise network domain, a user enabling domain, an operational management domain, a platform and facilities domain, a delivery enabling domain, a security enabling domain, and a middleware domain. The data platform domain includes the sub-domains of data platform, data management, data movement, data governance, and tools. The content and data science domain includes the sub-domains of data science platform, content generation, enterprise content management (ECM), and content lifecycle management. The enterprise network domain includes sub-domains of content center and voice/video and network. The user enabling domain includes sub-domains of collaboration, contact center/communication, endpoint devices, social networking, and user productivity. The operational management domain includes sub-domains of automation, infrastructure management, service management, and system management. The platform and facilities domain includes sub-domains of hardware, OS, facilities, storage, and tape. The delivery enabling domain includes sub-domains of continuous integration and continuous delivery ("CI/CD"), design tools, testing, development, software development management, and delivery management. The security enabling domain includes sub-domains of data protection, governance risk and compliance, information security management, vendor security services, infrastructure protection services, privilege management infrastructure, and threat and vulnerability management. The middleware domain includes sub-domains of application container capabilities and integration capabilities.

Each application system also may be classified based on its lifecycle. Specifically, technologies migrate through a multi-step maturation process ranging from: (1) emerging to (2) standard to (3) exception to (4) declining—end of life. The systems and methods described facilitate the management of application systems through this process, and with specific focus based on domain and sub-domain.

The systems described utilize a snapshot or "placemat view" of the application systems. Specifically, the technology management server processor is configured to scan the application systems to determine a first system status for each application system. The processor is then configured to define the architecture definition file identifying the prior system status for each snapshotted application system based on the first system status for each corresponding application system.

The processor is also configured to receive the architecture definition file created from the prior snapshot of the application systems. As explained, the architecture definition file identifies a prior system status for each snapshotted application system. The snapshot (or "placemat view") is typically previously captured by the processor.

The processor is also configured to scan the application systems to determine a present system status for each application system. In general, the present system status includes a determination of at least: (a) application type; (b) application state; (c) application version; (d) application interconnection to other application systems.

The processor is also configured to classify each of the scanned application systems into an associated technology domain using a domain classification algorithm. In some examples, the processor classifies at a more granular level including sub-domains or application types. For example, the processor may be configured to classify each of the scanned application systems into the associated technology domain and an associated technology sub-domain using the domain classification algorithm. In an example embodiment, the domain classification algorithm functions as follows. The domain classification algorithm identifies and retrieves a plurality of documents, text, or other information associated with e ach scanned application by searching for information responsive to an identifier associated with each application system. The domain classification algorithm analyzes the retrieved information to identify relevant terms from each of the retrieved information. In one example, the terms are identified using a keyword lookup based on a predefined list of terms associated with each technology domain and technology sub-domain. In other examples, the terms may be first identified using a term frequency-inverse document frequency method which identifies important or salient terms from each document or piece of information. The terms associated with each application system are ranked and the compared to a table matching responsive terms to technology domains and sub-domains. In one example, the table is pre-determined. In another example, the table is determined by analysis of the corpus of retrieved information for all application systems, such that application systems with overlapping terms are grouped together and associated with a particular technology domain and sub-domain that may be determined from the overlapping terms or from user input.

In some examples, the domain classification algorithm is further configured to provide additional capabilities including optimizing terms that are used for classifications. In one example, the domain classification algorithm performs deduplication functions by identifying classification terms that are overlapping or identical. In such an example, the domain classification algorithm scans the classifications and applies a fuzzy logic matching algorithm to identify classifications that overlap with one another as candidate duplicative classifications. Further, the domain classification algorithm scans the candidate duplicative classifications to determine if the applications in each corresponding candidate duplicative classification (i.e., the classifications that overlap with one another) are duplicative. If the applications are duplicative, the algorithm selectively deduplicates the classifications. The domain classification algorithm is also configured to identify additional domains and sub-domains by, for example, retrieving candidate terms describing domains from external systems including expert systems. In operation, the domain classification system may periodically send queries to obtain new terms associated with domains and sub-domains as reflected in external systems.

Some examples of the domain classification algorithm are described below. First, a group of database applications may be associated with literature describing the application systems. The domain classification algorithm scans and identifies each application and searches for associated information. The retrieved information is scanned using either keywords or term frequency-inverse document frequency methods to determine that relevant terms include "relational" and "database". The domain classification algorithm defines a domain for "relational" based on the frequency of the terms and sub-domains for particular implementations (e.g., for particular databases). When an application system for a MySQL database is identified, the domain classification algorithm scans and identifies each application and searches for associated information and determines that the information includes terms for "MySQL", "SQL", "relational" and "database" and groups the application system accordingly. Similarly, sub-domains are defined with increasingly precise term requirements. For example, a sub-domain to "relational" may be associated with Oracle™ database applications.

In such examples, the processor is also configured to obtain the system update for each scanned application system with a changed system status. In such cases, the system update is obtained based on the technology domain and technology sub-domain. Similarly, in such cases, the system updates define implementation characteristics of each changed scanned application system. In other similar cases, the processor may classify based on application type and obtain the system update based on application type. In the example embodiment, the processor classifies each application system in to a domain including one of a data platform domain, a content and data science domain, an enterprise network domain, a user enabling domain, an operational management domain, a platform and facilities domain, a delivery enabling domain, a security enabling domain, and a middleware domain.

The processor is further configured to identify each scanned application system with a changed system status by comparing the associated prior system status to the associated present system statuses. As such the technology management system identifies changes in the environment actively.

The systems described also facilitate an information pipeline regarding application deployment. For example, when a new application comes on line or an application changes state, it is useful to collect information regarding system status. Accordingly, the processor is configured to obtain a system update for each scanned application system with a changed system status. The system update is obtained based on the technology domain, with each domain (or sub-domain) involving distinct query questions. The system updates define implementation characteristics of each changed scanned application system. The system update may be obtained from an external system (such as an operations management system) or a user.

The processor is also configured to redefine the architecture definition file with the system updates and apply the architecture definition file to the application systems to update the application systems based, in part, on the system updates.

In some examples, the processor also defines the system update protocol by identifying a set of necessary information to obtain in an update for an application system for each technology domain. Accordingly, the processor obtains the system update based, in part, on the system update protocol.

As noted, one use of the methods and systems is to manage technologies across their life cycles. Accordingly, the processor is configured to determine the state of an application system and determine whether the scanned application system includes a new application, an emerging application, a standard application, an exception, or an end-of-life application. Upon determining the scanned application system includes a new application, the processor is configured to determine whether the new application is approved for use in the infrastructure and apply the architecture definition file to the application systems including approved new applications.

Generally, the systems and methods described herein are configured to perform at least the following steps: receive an architecture definition file created from a prior snapshot of the application systems wherein the architecture definition file identifies a prior system status for each snapshotted application system; scan the application systems to determine a present system status for each application system; classify each of the scanned application systems into an associated technology domain using a domain classification algorithm; identify each scanned application system with a changed system status by comparing the associated prior system status to the associated present system statuses; obtain a system update for each scanned application system with a changed system status, wherein the system update is obtained based on the technology domain, wherein the system updates define implementation characteristics of each changed scanned application system; redefine the architecture definition file with the system updates; apply the architecture definition file to the application systems to update the application systems based, in part, on the system updates; scan the application systems to determine a first system status for each application system; define the architecture definition file identifying the prior system status for each snapshotted application system based on the first system status for each corresponding application system; classify each of the scanned application systems into the associated technology domain and an associated technology sub-domain using the domain classification algorithm; obtain the system update for each scanned application system with a changed system status, wherein the system update is obtained based on the technology domain and technology sub-domain, wherein the system updates define implementation characteristics of each changed scanned application system; classify each of the scanned application systems into the associated technology domain using the domain classification algorithm, wherein the technology domain is one of a data platform domain, a content and data science domain, an enterprise network domain, a user enabling domain, an operational management domain, a platform and facilities domain, a delivery enabling domain, a security enabling domain, and a middleware domain; define a system update protocol identifying a set of necessary information to obtain in an update for an application system for each technology domain; obtain the system update based, in part, on the system update protocol; obtain the system update including determining whether the scanned application system includes a new application; upon determining the scanned application system includes a new application, determine whether the new application is approved; and apply the architecture definition file to the application systems including approved new applications.

Figure 2:
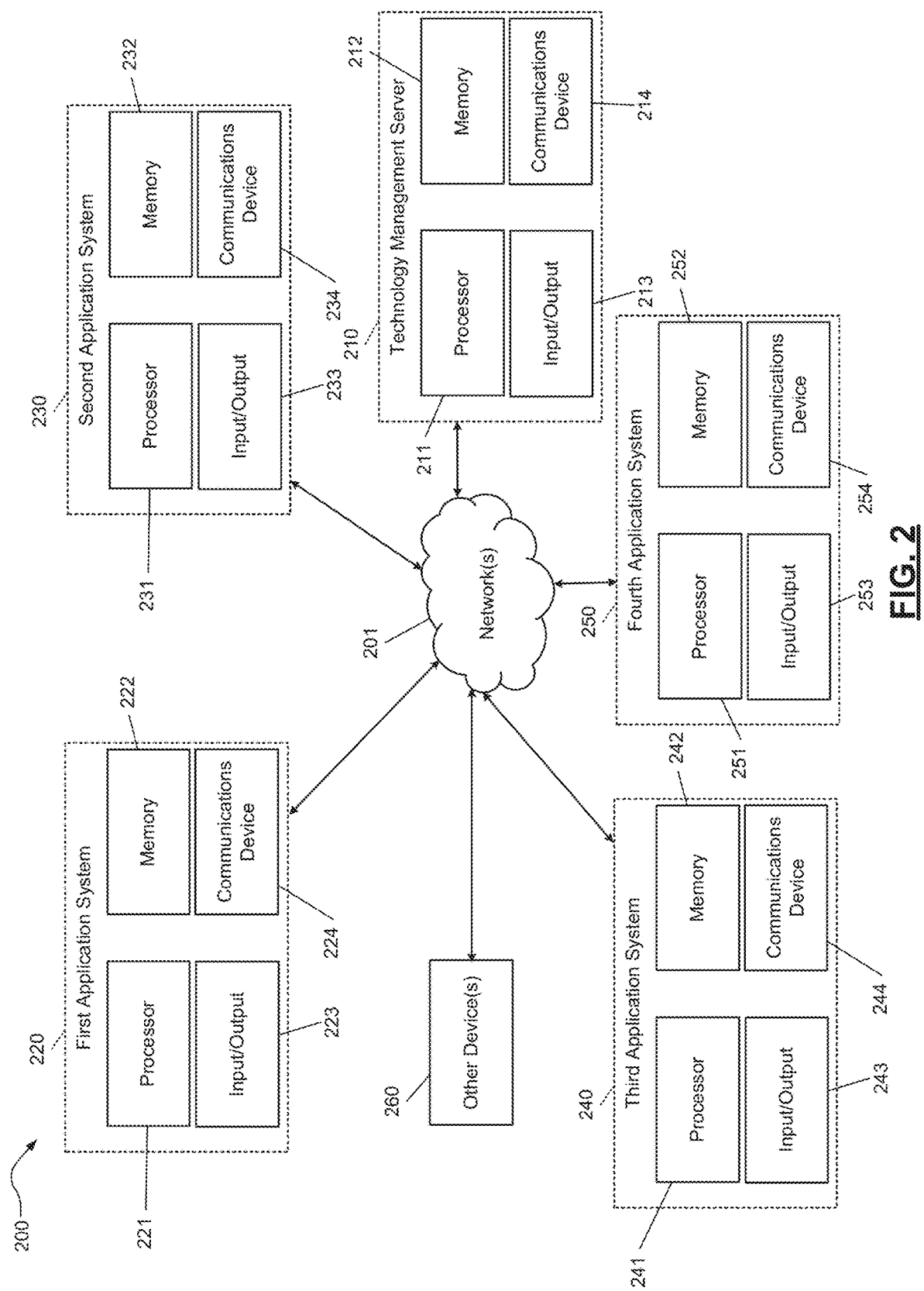
FIG. 2 is a functional block diagram of a domain-based technology deployment and management system that may be deployed using the computing devices shown in FIG. 1.

FIG. 1 is a functional block diagram of an example computing device 100 that may be used in the domain-based technology deployment and management systems described, and may represent the application systems and technology management server (all shown in FIG. 2.) Specifically, computing device 100 illustrates an exemplary configuration of a computing device for the systems shown herein, and particularly in FIG. 2. Computing device 100 illustrates an exemplary configuration of a computing device operated by a user 101 in accordance with one embodiment of the present invention. Computing device 100 may include, but is not limited to, the application systems, and technology management server (all shown in FIG. 2.), other user systems, and other server systems. Computing device 100 may also include mobile computing devices, stationary computing devices, computing peripheral devices, smart phones, wearable computing devices, medical computing devices, and vehicular computing devices. Alternatively, computing device 100 may be any computing device capable of the technology management methods. In some variations, the characteristics of the described components may be more or less advanced, primitive, or non-functional.

In the exemplary embodiment, computing device 100 includes a processor 111 for executing instructions. In some embodiments, executable instructions are stored in a memory area 112. Processor 111 may include one or more processing units, for example, a multi-core configuration. Memory area 112 is any device allowing information such as executable instructions and/or written works to be stored and retrieved. Memory area 112 may include one or more computer readable media.

Computing device 100 also includes at least one input/output component 113 for receiving information from and providing information to user 101. In some examples, input/output component 113 may be of limited functionality or non-functional as in the case of some wearable computing devices. In other examples, input/output component 113 is any component capable of conveying information to or receiving information from user 101. In some embodiments, input/output component 113 includes an output adapter such as a video adapter and/or an audio adapter. Input/output component 113 may alternatively include an output device such as a display device, a liquid crystal display (LCD), organic light emitting diode (OLED) display, or "electronic ink" display, or an audio output device, a speaker or headphones. Input/output component 113 may also include any devices, modules, or structures for receiving input from user 101. Input/output component 113 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 113. Input/output component 113 may further include multiple sub-components for carrying out input and output functions.

Computing device 100 may also include a communications interface 114, which may be communicatively coupleable to a remote device such as a remote computing device, a remote server, or any other suitable system. Communication interface 114 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 114 is configured to allow computing device 100 to interface with any other computing device or network using an appropriate wireless or wired communications protocol such as, without limitation, BLUETOOTH®, Ethernet, or IEE 802.11. Communications interface 114 allows computing device 100 to communicate with any other computing devices with which it is in communication or connection.

FIG. 2 is a functional block diagram of a domain-based technology deployment and management system 200 that may be deployed using the computing devices shown in FIG. 1. System 200 includes technology management server 210 configured to perform the functions described herein including domain-based technology deployment and management. System 200 is in communication, via network 201, to application systems 220, 230, 240, and 250 and other devices 260. In the example embodiment, network 201 allows connectivity between systems 210, 220, 230, 240, 250, and 260 using any suitable means including networked connection or wireless connection using any suitable networking protocol including, but not limited to, WiFi, Bluetooth®, 802.11 standards, or Ethernet standards. Each of systems 210, 220, 230, 240, 250, and 260 include an associated processor 211, 221, 231, 241, and 251, an associated memory 212, 222, 232, 242, and 252, an associated input/output 213, 223, 233, 243, and 253, and a communications device 214, 224, 234, 244, and 254 that are configured to perform in the manner described in discussing their analogous components in FIG. 1.

Each of application systems 220, 230, 240, and 250 are configured to provide technology services including, for example, data platform applications, content and data science applications, enterprise network applications, user enabling applications, operational management applications, platform and facilities applications, delivery enabling applications, security enabling applications, and middleware applications. The data platform applications may include applications for data platform, data management, data movement, data governance, and tools. The content and data science applications may include applications for data science platform, content generation, enterprise content management (ECM), and content lifecycle management. The enterprise network applications may include applications for content center and voice/video and network. The user enabling applications may include applications for collaboration, contact center/communication, endpoint devices, social networking, and user productivity. The operational management applications may include applications for automation, infrastructure management, service management, and system management. The platform and facilities applications may include applications for hardware, OS, facilities, storage, and tape. The delivery enabling applications may include applications for continuous integration and continuous delivery ("CI/CD"), design tools, testing, development, software development management, and delivery management. The security enabling applications may include applications for data protection, governance risk and compliance, information security management, vendor security services, infrastructure protection services, privilege management infrastructure, and threat and vulnerability management. The middleware applications may include applications for application container capabilities and integration capabilities. As described herein, technology management server 210 may interact with several, dozens, hundreds, or more application servers. As such, although FIG. 2 illustrates four application systems 220, 230, 240, and 250, system 200 may facilitate domain-based technology deployment and management for far more systems.

In operation, technology management server 210 is configured to capture a snapshot of the application systems 220, 230, 240, and 250 (and other any other application systems) and store it as an architecture definition file that defines a prior system status for each snapshotted application system 220, 230, 240, and 250 (and other any other application systems). Technology management server 210 scans application systems 220, 230, 240, and 250 (and other any other application systems) to determine a present system status for each application system. Technology management server 210 also classifies each of the scanned application systems 220, 230, 240, and 250 (and other any other application systems) into an associated technology domain using a domain classification algorithm 408 and identifies each scanned application system with a changed system status by comparing the associated prior system status to the associated present system statuses. Technology management server 210 also obtains a system update for each scanned application system 220, 230, 240, and 250 (and other any other application systems) with a changed system status. The system update is obtained based on the determined technology domain. The technology management server 210 also updates define implementation characteristics of each changed scanned application system 220, 230, 240, and 250 (and other any other application systems). The technology management server 210 further redefines the architecture definition file with the system updates and applies the architecture definition file to the application systems 220, 230, 240, and 250 (and other any other application systems) to update the application systems based, in part, on the system updates.

In some examples, technology management server 210 is configured to scan the application systems 220, 230, 240, and 250 (and other any other application systems) to determine a first system status for each application system. Technology management server 210 is also configured to define the architecture definition file identifying the prior system status for each snapshotted application system 220, 230, 240, and 250 (and other any other application systems) based on the first system status for each corresponding application system.

Technology management server 210 is also configured to classify each of the scanned application systems 220, 230, 240, and 250 (and other any other application systems) into the associated technology domain and an associated technology sub-domain using the domain classification algorithm 408. Technology management server 210 also obtains the system update for each scanned application system 220, 230, 240, and 250 (and other any other application systems) with a changed system status. The system update is obtained based on the technology domain and technology sub-domain, wherein the system updates define implementation characteristics of each changed scanned application system.

In some examples, technology management server 210 is configured to classify each of the scanned application systems 220, 230, 240, and 250 (and other any other application systems) into the associated technology domain using the domain classification algorithm 408. In such embodiments, the technology domains may be one of a data platform domain, a content and data science domain, an enterprise network domain, a user enabling domain, an operational management domain, a platform and facilities domain, a delivery enabling domain, a security enabling domain, and a middleware domain. In other embodiments, more domains may be defined.

The technology management server 210 is also configured to define a system update protocol identifying a set of necessary information to obtain in an update for an application system for each technology domain. Technology management server 210 also obtains the system update based, in part, on the system update protocol.

The technology management server 210 is also configured to obtain the system update including determining whether the scanned application system includes a new application. In such embodiments, upon determining the scanned application system includes a new application, the technology management server 210 is configured to determine whether the new application is approved and apply the architecture definition file to the application systems including approved new applications.

Figure 3:
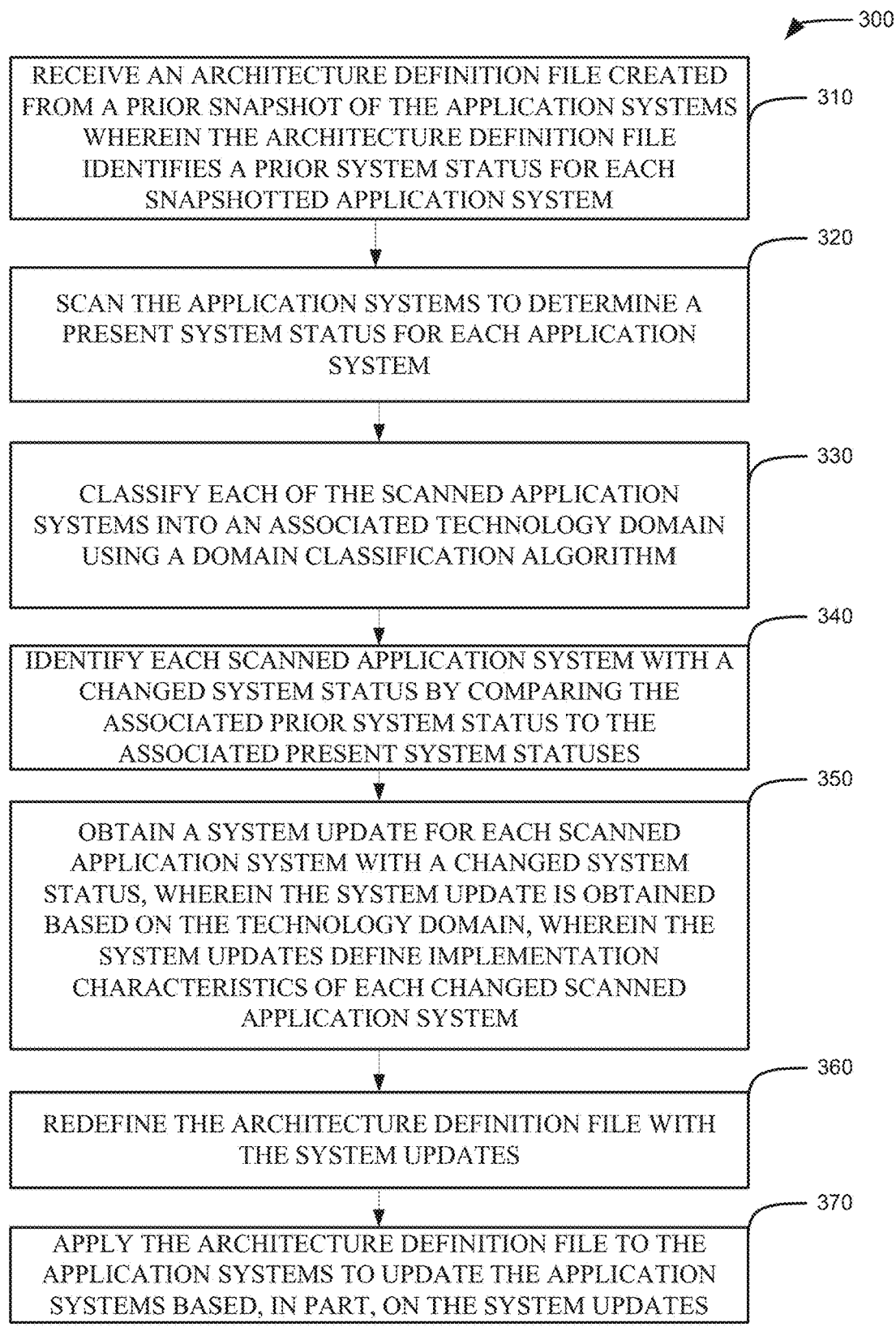
FIG. 3 is a flow diagram representing the domain-based technology deployment and management process from the perspective of the technology management server shown in FIG. 2.

FIG. 3 is a flow diagram 300 representing the domain-based technology deployment and management process from the perspective of the technology management server 210 shown in FIG. 2. Specifically, technology management server 210 is configured to receive 310 an architecture definition file created from a prior snapshot of the application systems. The architecture definition file identifies a prior system status for each snapshotted application system. Technology management server 210 is also configured to scan 320 the application systems to determine a present system status for each application system. Technology management server 210 is additionally configured to classify 330 each of the scanned application systems into an associated technology domain using a domain classification algorithm 408. Technology management server 210 is also configured to identify 340 each scanned application system with a changed system status by comparing the associated prior system status to the associated present system statuses. Technology management server 210 is further configured to obtain 350 a system update for each scanned application system with a changed system status. The system update is obtained based on the technology domain, wherein the system updates define implementation characteristics of each changed scanned application system. Technology management server 210 is also configured to redefine 360 the architecture definition file with the system updates. Technology management server 210 is also configured to apply 370 the architecture definition file to the application systems to update the application systems based, in part, on the system updates.

Figure 4:
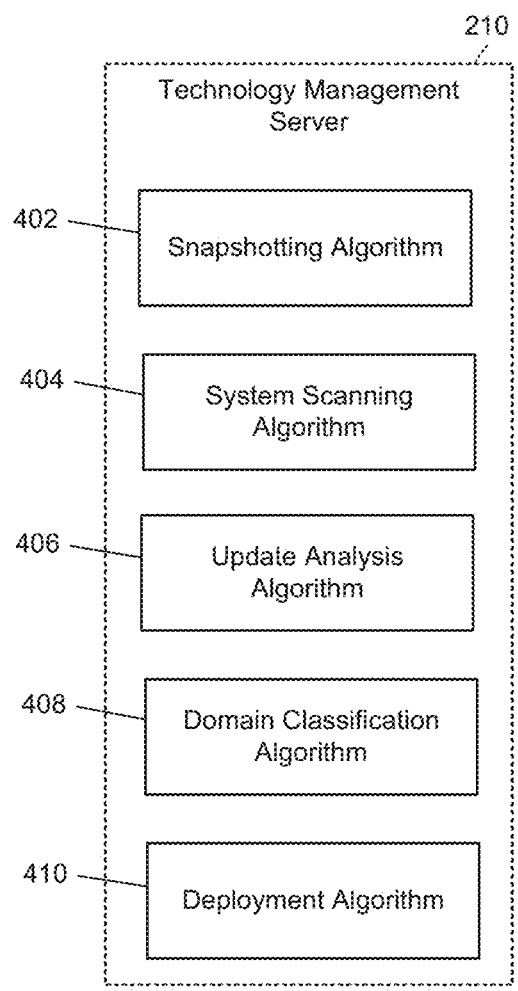
FIG. 4 is a diagram of elements of one or more example computing devices that may be used in the system shown in FIG. 2.

FIG. 4 is a diagram of elements of one or more example computing devices that may be used in the system shown in FIG. 2. Specifically, FIG. 4 describes subsystems available to technology management server 210 capable of providing the functionality described herein. Technology management server 210 includes a snapshotting algorithm 402 configured to capture prior snapshots of the application servers and create architecture definition files. Technology management server 210 includes a system scanning algorithm 404 configured to scan the application systems to determine a present system status for each application system. System scanning algorithm 404 also obtains a system update for each scanned application system with a changed system status. Technology management server 210 includes an update analysis algorithm 406 configured to perform steps including identifying each scanned application system with a changed system status by comparing the associated prior system status to the associated present system statuses. Technology management server 210 also includes a domain classification algorithm 408 configured to classify the application servers into domains and sub-domains. Technology management server 210 also includes a deployment algorithm 410 configured to redefine the architecture definition file with the system updates and apply the architecture definition file to the application systems to update the application systems based, in part, on the system updates.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WiFi wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A technology management server for domain-based technology deployment and management, comprising:
　a communications device configured to establish a communications connection to an application system;
　at least one memory component; and
　at least one processor communicatively coupled to the communications device and the at least one memory component, the at least one processor configured to:
　　scan the application system to determine a present system status for the application system;
　　classify the application system into an associated technology domain, based on scanning the application system;
　　perform a comparison of a prior system status for the application system to the present system status; and
　　when the comparison indicates a changed system status for the application system,
　　　obtain a system update for the application system with the changed system status, based on the associated technology domain, wherein the system update defines implementation characteristics of the application system with the changed system status; and
　　　update the application system based on at least the system update.

2. The technology management server of claim 1, wherein the at least one processor is further configured to:
　receive an architecture definition file created from a prior snapshot of the application system; and
　identify the prior system status for the application system, based on the prior snapshot.

3. The technology management server of claim 2, wherein the at least one processor is further configured to:
　scan the application system to determine a first system status for the application system; and
　define the architecture definition file identifying the prior system status for the application system based on the first system status.

4. The technology management server of claim 2, wherein the at least one processor is further configured to:
　redefine the architecture definition file with the system update, to generate a redefined architecture definition file,
　wherein updating the application system based on at least the system update further comprises applying the redefined architecture definition file to the application system.

5. The technology management server of claim 1, wherein the at least one processor is further configured to:
　classify the application system into the associated technology domain and an associated technology sub-domain using a domain classification algorithm; and
　obtain the system update for the application system with the changed system status, based on the associated technology domain and the associated technology sub-domain, wherein the system update defines implementation characteristics of the application system with the changed system status.

6. The technology management server of claim 1, wherein the at least one processor is further configured to:
　define a system update protocol identifying a set of necessary information to obtain in an update for a set of application systems associated with a particular technology domain, the set of application systems comprising the application system, and the particular technology domain comprising the associated technology domain; and obtain the system update based on at least the system update protocol.

7. The technology management server of claim 1, wherein the at least one processor is further configured to:
   determine whether the application system includes a new application, based on the system update; and
   when the application system includes a new application, update the application system including the new application, based on at least the system update.

8. The technology management server of claim 1, wherein the at least one processor is further configured to:
   when the application system includes a new application, determine an approval status for the new application; and
   when the approval status indicates the new application comprises an approved new application,
      update the application system including the approved new application.

9. A method for domain-based technology deployment and management performed by a technology management server in communication with an application system, the method comprising:
   scanning the application system to determine a present system status for the application system;
   classifying the application system into an associated technology domain, based on scanning the application system;
   performing a comparison of a prior system status for the application system to the present system status; and
   when the comparison indicates a changed system status for the application system,
      obtaining a system update for the application system with the changed system status, based on the associated technology domain, wherein the system update defines implementation characteristics of the application system; and
      updating the application system based on at least the system update.

10. The method of claim 9, further comprising:
    receiving an architecture definition file created from a prior snapshot of the application system; and
    identifying the prior system status for the application system, based on the prior snapshot.

11. The method of claim 10, further comprising:
    redefining the architecture definition file with the system update, to generate a redefined architecture definition file;
    wherein updating the application system based on at least the system update further comprises applying the redefined architecture definition file to the application system.

12. The method of claim 9, further comprising:
    classifying the application system into the associated technology domain and an associated technology subdomain using a domain classification algorithm; and
    obtaining the system update for the application system with the changed system status, based on the associated technology domain and the associated technology subdomain, wherein the system update defines implementation characteristics of the application system with the changed system status.

13. The method of claim 9, wherein classifying the application system into the associated technology domain further comprises:

implementing a domain classification algorithm to classify the application system into at least one domain,
wherein the associated technology domain comprising the at least one domain, and
wherein the associated technology domain comprises one of a data platform domain, a content and data science domain, an enterprise network domain, a user enabling domain, an operational management domain, a platform and facilities domain, a delivery enabling domain, a security enabling domain, and a middleware domain.

14. The method of claim 9, further comprising:
    defining a system update protocol identifying a set of necessary information to obtain in an update for a set of application systems associated with a particular technology domain, the set of application systems comprising the application system, and the particular technology domain comprising the associated technology domain; and
    obtaining the system update based on at least the system update protocol.

15. A computing device including a processor and a memory component having instructions stored thereon, which, when executed by the processor, perform a method comprising:
    classifying an application system into an associated technology domain, the application system being communicatively coupled to the computing device;
    identifying a changed system status for the application system;
    obtaining a system update for the application system, based on the changed system status and the associated technology domain, wherein the system update defines implementation characteristics of the application system with the changed system status; and
    updating the application system based on at least the system update.

16. The computing device of claim 15, wherein the method further comprises:
    receiving an architecture definition file created from a prior snapshot of the application system;
    identifying a prior system status for the application system, based on the prior snapshot; and
    identifying the changed system status, based on the prior system status.

17. The computing device of claim 16, wherein the method further comprises:
    scanning the application system to determine a present system status for the application system; and
    performing a comparison of the prior system status to the present system status to identify the changed system status.

18. The computing device of claim 15, wherein the method further comprises:
    classifying the application system into the associated technology domain and an associated technology subdomain using a domain classification algorithm; and
    obtaining the system update for the application system based on the changed system status, the associated technology domain, and the associated technology subdomain, wherein the system update defines implementation characteristics of the application system.

19. The computing device of claim 15, wherein classifying the application system into the associated technology domain further comprises:
    implementing a domain classification algorithm to classify the application system into at least one domain, wherein the associated technology domain comprising the at least one domain, and wherein the associated technology domain comprises one of a data platform domain, a content and data science domain, an enterprise network domain, a user enabling domain, an operational management domain, a platform and facilities domain, a delivery enabling domain, a security enabling domain, and a middleware domain.

20. The computing device of claim 15, wherein updating the application system based on at least the system update further comprises:

obtaining the system update including determining whether the application system includes at least one new application;

upon determining the application system includes the at least one new application, determine whether the at least one new application comprises approved new applications; and updating the application system including the approved new applications.

* * * * *